United States Patent [19]

Aikens

[11] Patent Number: 4,612,691

[45] Date of Patent: Sep. 23, 1986

[54] MANAGEMENT APPARATUS FOR A CABLE HAVING PLURAL CONDUCTORS ARRANGED IN ONE OR MORE LAYERED ARRAYS

[75] Inventor: Paul W. Aikens, Etters, Pa.

[73] Assignee: E. I. Du Pont de Nemours and Company, Wilmington, Del.

[21] Appl. No.: 685,027

[22] Filed: Dec. 21, 1984

[51] Int. Cl.$^4$ ............................................ H01R 43/00
[52] U.S. Cl. .................................. 29/33 R; 29/33 M; 29/748
[58] Field of Search ............... 29/33 R, 747, 748, 749, 29/753, 754, 755, 857, 858, 859, 861, 867, 33 F, 33 M

[56] References Cited

U.S. PATENT DOCUMENTS 4,247,980  2/1981  Tominoi ................................ 29/748
4,330,927  5/1982  Wolfthal .............................. 29/748
4,517,718  5/1985  Johnson, Jr. ......................... 29/748

*Primary Examiner*—Gil Weidenfeld
*Assistant Examiner*—Daniel W. Howell

[57] ABSTRACT

An apparatus for separating individual conductors in an array thereof is characterized by a member having an abutment surface operable against the axial ends of the conductors to cause the same to buckle radially outwardly of the axis of the cable to form a buckled array of conductors. A rotator assembly is provided for rotating each conductor in a buckled array past a reference position. A grasping finger selects the conductor disposed at the reference position and transposes the same to a different predetermined position.

16 Claims, 6 Drawing Figures

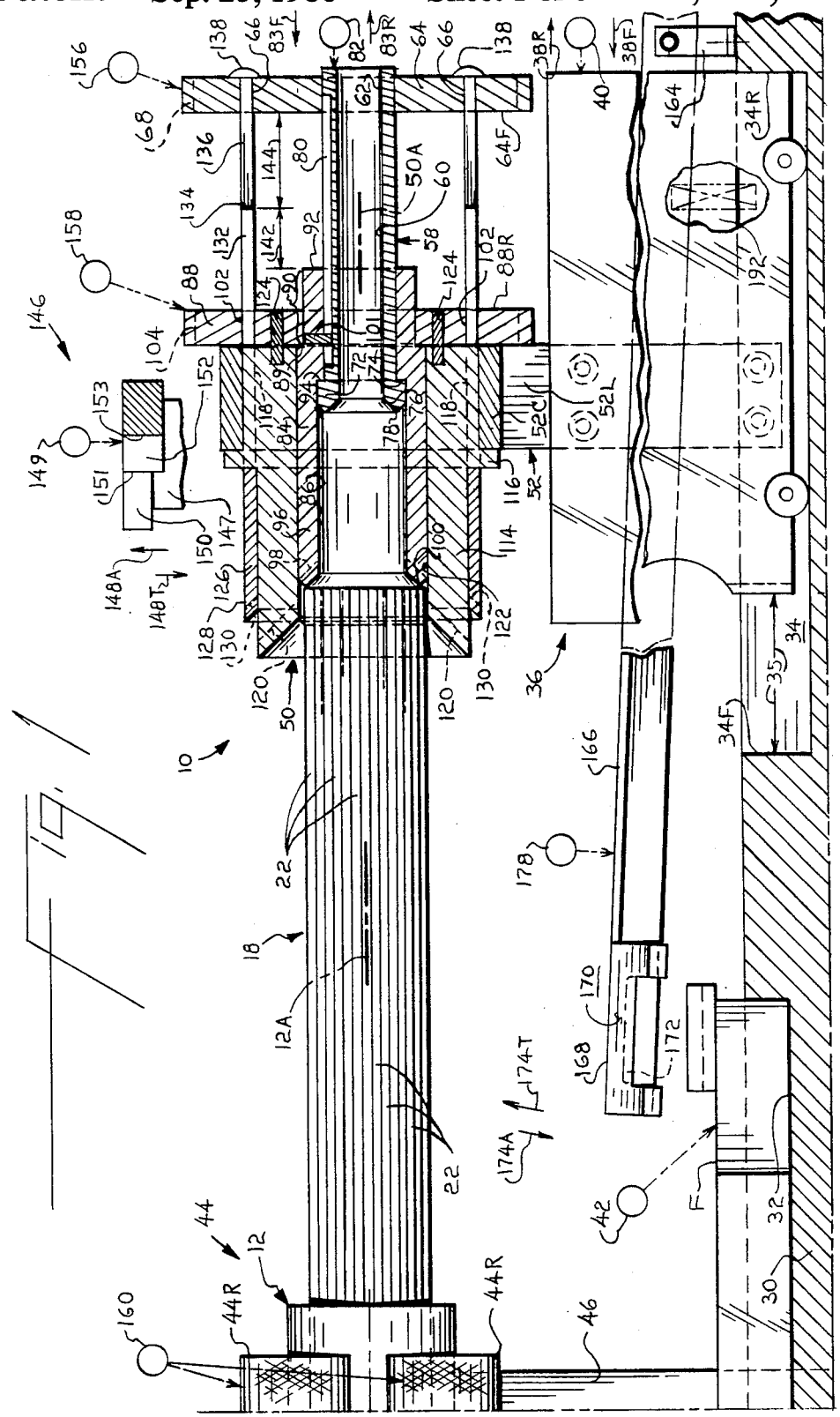

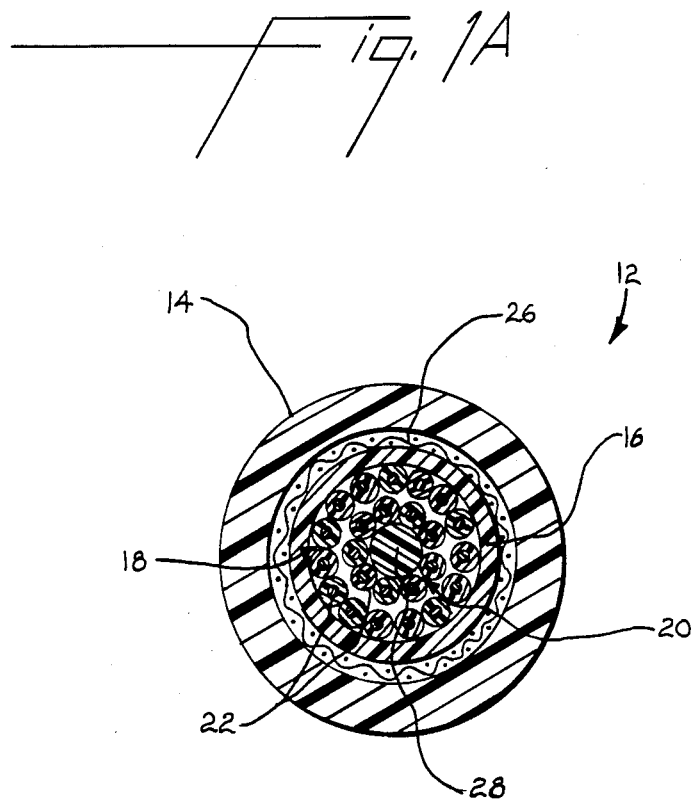

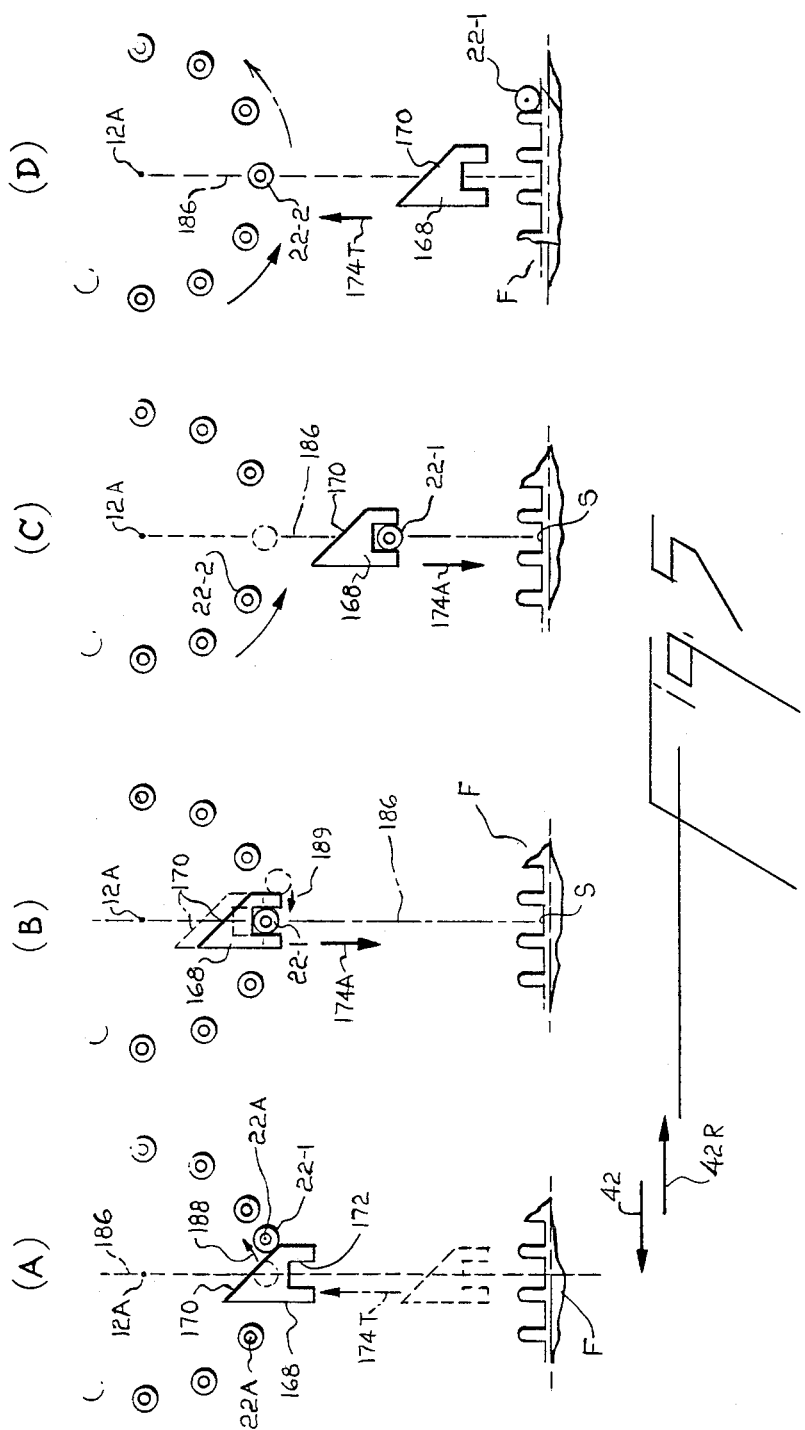

MANAGEMENT APPARATUS FOR A CABLE HAVING PLURAL CONDUCTORS ARRANGED IN ONE OR MORE LAYERED ARRAYS

BACKGROUND OF THE INVENTION

This invention relates to a management apparatus for disassembling a cable having a plurality of individual conductors arranged in one or more layered arrays.

Electrical cable is typically provided from the manufacturer in the form of a structure having a substantially circular cross section that carries within it one or more substantially concentric circular arrays of individual electrical conductors. Each of the conductors is provided with its own insulating jacket. A metallized foil and/or insulating plastic wrapper is sheathed about the exterior of the outer array of conductors. The entire assembly is surrounded by the insulating jacket of the cable.

It is necessary in practice to disassemble The cable and to connect each of the conductors in each of the concentric arrays to coresponding electrical connection points whereby any given conductor is terminated at each end thereof in a corresponding electrical circuit. To facilitate this disassembly and interconnection it is necessary to strip from the cable the outer insulating jacket and the insulating sheath thereby to expose and to liberate from their constrained condition each of the individual conductors in each array thereof. The management problem encountered in handling the relatively large number of individual conductors and the introduction of each of them into an appropriate fixture presents a most cost inefficient aspect of cable disassembly.

Accordingly, in view of the foregoing, it is believed to be advantageous to provide a management apparatus adapted to disassemble a cable of the type having one or more layered arrays of conductors, each array containing a plurality of individual electrical conductors, and for separating the individual conductors in each array and placing them into a predetermined pattern in an appropriate fixture.

SUMMARY OF THE INVENTION

Apparatus in accordance with the present invention for separating individual conductors in a multi-conductor circular array comprises a gripping assembly in the form of a clamp for gripping the circular cable about the exterior of the jacket thereof at a predetermined point spaced a predetermined distance from the axial ends of the conductors, a member having an abutment surface thereon operative against the axial ends of the individual conductors for bowing the conductors to form a spread array thereof in which each conductor is buckled outwardly from the axis of the cable, the spread array being formed intermediate the gripping assembly and the member, a rotator assembly for rotating each conductor in the buckled array past a predetermined reference position and, a finger for grasping the conductor disposed at the reference position and transporting the same to a different predetermined location, preferably within a suitable fixture.

BRIEF DESCRIPTION OF THE DRAWINGS

The invention will be more fully understood from the following detailed description thereof taken in connection with the accompanying drawings which form a part of this application and in which:

FIGS. 1 through 4 are side elevational views in section illustrating the cable management apparatus in accordance with the present invention in various operating positions whereby the individual conductors arranged in first and second concentric layered arrays are separated and bowed into a buckled array;

FIG. 1A is an end view of a typical cable structure operated upon by the management apparatus in accordance with the present invention; and FIGS. 5A through 5D are stylized schematic representations of the action of the grasping finger for transposing an individual conductor disposed in a buckled array from a reference position to a different predetermined position such as to a position within a suitable fixture.

DETAILED DESCRIPTION OF THE INVENTION

Figure 2:
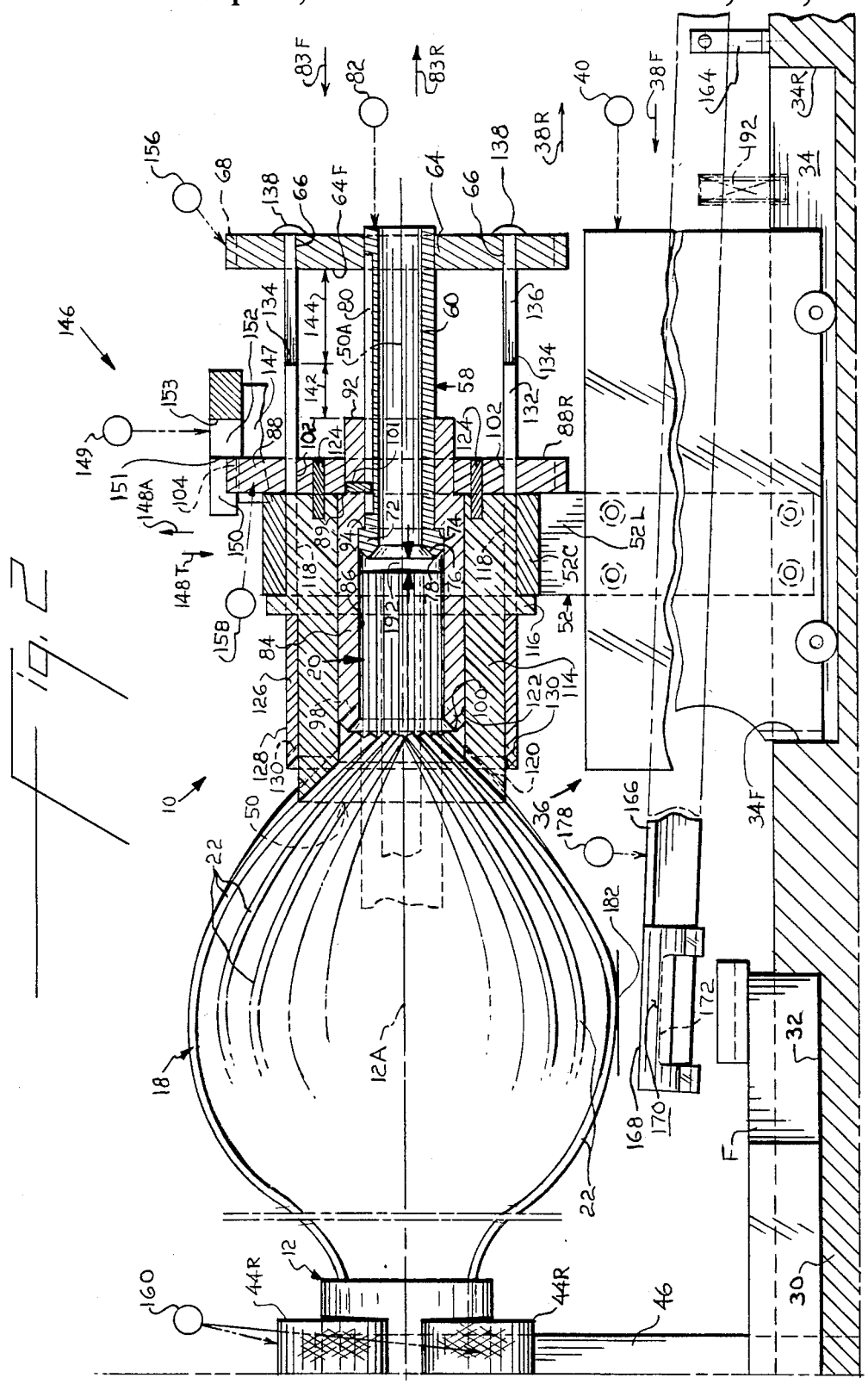

Throughout the following detailed description similar reference numerals refer to similar elements in all figures of the drawings.

A conductor management apparatus generally indicated by reference character 10 in accordance with the present invention is adapted for the automated disassembly of a circular cable generally indicated by reference character 12 and for the insertion of the individual conductors 22 thereof into a predetermined fixture F. As may be seen from FIG. 1A the cable 12 is typically of the type organized as having an outer insulating jacket 14 with an insulating sheath 16 (typically of a plastic material) disposed therebeneath. The cable 12 contains at least one, but usually a plurality, of substantially concentric arrays of individual electrical conductors. In FIG. 1A two arrays are shown with the outer array of conductors being indicated by reference character 18 while the inner array is indicated by the reference character 20. Each array 18, 20 of conductors contains a predetermined number of individual electrical conductors each of which is indicated by the reference character 22. A typical cable 12 with which the apparatus 10 may be used includes twenty-four conductors arranged with fifteen conductors in the outer array 18 and nine conductors disposed in the inner array 20. Of course, an apparatus 10 in accordance with the present invention may be used to manage a cable 12 having any predetermined number of conductors 22 arranged in any predetermined count in the inner and outer layers thereof. Moreover, the apparatus 10 may be further modified to manage a cable having more than two layers and also remain with the contemplation of the present invention. Each of the conductors 22 includes its own insulating jacket surrounding one or more conducting and/or shielding elements. Although not shown in the Figures for clarity of illustration the conductors 22 in each array 18, 20 are helically arranged with respect to the longitudinal axis 12A of the cable 12. The apparatus 10 accommodates the helix of each array in a manner to be discussed. A braided sheathing or ground plane 26 may be disposed about the radially outer array 18 of conductors intermediate the sheath 16 and the jacket 14. A core 28 extends centrally and axially along the interior of the cable.

Referring again to FIG. 1, the apparatus 10 in accordance with the present invention includes a base plate 30 in the form of a relatively massive generally planar member fabricated from any suitable material. The base plate 30 has a recess 32 formed therein. The recess 32 is sized and configured to accommodate the fixture F. The fixture F is provided with an array of slots S, each of which may receive, in a manner to be described, the individual conductors 22 from each layered array 18, 20 of the cable 12. The base plate 30 has an elongated slot 34 formed therein. The forward and rear boundaries of the slot 34 are respectively indicated by reference characters 34F and 34R. The boundaries of the slot 34 form suitable stop surfaces which limit the rectilinear displacement of a carriage 36 within the slot 34. An actuator indicated schematically at 40 is provided for relatively displacing the carriage 36 within the slot 34 with respect to the base plate 30 in the direction of the double arrows 38F, 38R. Similarly, a suitable actuator indicated schematically at 42 is provided for relatively moving the fixture F in predetermined directions 42R, 42L (FIG. 5) with respect to the base plate 30 within the recess 32 past a predeterined reference location 186 (FIG. 5). As is the case for any of the various actuators discussed in the specification or shown in the drawings the actuators 40, 42 may be configured in any suitable form. Any of the actuators may be manually, mechanically, electrically, hydraulically, pneumatically or otherwise powered to provide the force needed to accomplish the function set forth and still remain within the contemplation of the present invention.

A gripping arrangement 44 in the form of a clamp is mounted above the base plate 30 on a suitable support post 46. The gripping arrangement 44 is operative to securely grip the exterior of the cable 12 and maintain the same in a fixed axial position relative to the base plate 30. The gripping arrangement 44 is adapted to accommodate rotational movement of the cable 12 about the axis 12A thereof. To this end an array of rollers 44R are provided. It should be appreciated that any gripping arrangement whereby the cable 12 is prevented from movement along its axis 12A with respect to the base plate 30 and yet which permits the rotational motion for the purpose to be described lies within the contemplation of this invention.

A head assembly generally indicated by reference character 50 is mounted to the carriage 36 by means of a support bracket 52. The bracket 52 includes downwardly extending legs 52L and a collar portion 52C. The legs 52L are secured to the carriage 36 and the circular collar portion 52C surrounds the head assembly 50 to support the same at a predetermined distance above the base plate 30 such that the axis 50A of the head assembly 50 lies in collinearity with the axis 12A of the cable 12.

The head assembly 50 includes a substantially concentrically layered arrangement of elements adapted to operate against the axial ends of each of the individual conductors 22 in each array 18, 20 of the cable 12 to cause the conductors 22 to bow outwardly (FIGS. 2 and 4) thereby to form a spread or buckled array of conductors 22 intermediate the gripping arrangement 44 and the head 50. As will be developed herein the formation of a spread array of conductors in which each individual conductor is buckled outwardly from the axis 12A of the cable 12 provides sufficient clearance to facilitate the grasping of any of the individual conductors 22 without disturbing any adjacent conductor. The spacing of the conductors in the buckled array provides sufficient margin for error or "forgiveness" when grasping any individual conductor so the management task may be relatively expeditiously accomplished.

Moreover, as is developed herein, the apparatus 10 provides complete flexibility as to the sequence in which a conductor may be selected and as to the pattern in which conductors are placed in the fixture F.

The head assembly 50 includes as its innermost element an elongated hollow inner piston 58 having a central bore 60. The axis of the inner piston 58 is coincident with the axis 50A of the head 50. One end 62 of the inner piston 58 is suitably secured, as by a set screw (not shown), to a rear index wheel 64. The rear index wheel 64 is provided with a predetermined number of openings 66 for a purpose to be described. The outer periphery of the wheel 64 is provided with a number of index notches 68 also for a purpose to be more fully explicated herein. The number of notches 68 corresponds to the number of conductors in the inner array 20 (i.e., nine). Accordingly, the notches 68 are equiangularly arranged circumferentially about the wheel 64 with angular spacings of forty degrees therebetween. The opposite end 72 of the inner piston 58 is enlarged to define a circumferential step 74 extending around the exterior thereof. The end 72 is provided with a frustoconical surface 76 which terminates in a circumferentially extending rim 78 which defines an abutment or pushing surface. The frustoconical surface 76 of the inner piston 60 lies at a predetermined angle with respect to the axis 50A of the head assembly 50. The trailing portion of the outer surface of the inner piston 58 is provided with an axially extending slot 80. An actuator indicated schematically at 82 is provided to cause displacement of the inner piston 58 in directions 83F, 83R parallel to the axis 50A of the head 50.

A hollow outer piston 84 having a counterbore 86 is disposed concentrically about the inner piston 58. A forward index wheel 88 is slidably received over the rear exterior of the outer piston 84. A shoulder 89 is formed on the exterior of the outer piston 84 a predetermined distance 90 from the annular surface 92 which defines one end thereof. The outer piston 84 is provided substantially midway along its interior surface 86 with an annular shoulder 94 which is arranged to abut against the circumferential step 74 provided on the exterior surface of the inner piston 58. The other end 96 of the outer piston 84 is provided with an array of scooped indentations 98 which correspond in number to the number of conductors 22 in the inner array 20 (i.e., nine). The indentations 98 are equiangularly arranged about the end 96 of the outer piston 84. The indentations are axially aligned with the notches 68 on the periphery of the wheel 64. The outer piston 84 terminates in an annular rim 100 which, like the rim 78, define abutment or pushing surfaces which abut the axial ends of the conductors in the outer array 18 and the inner array 20, respectively. Of course, the abutment surfaces embodied by the rims 78, 100 may be defined in any convenient manner and remain within the contemplation of this invention. A pin 101 extends through the outer piston 84 into the slot 80 in the inner piston 58. The pin 101 is captured in the slot 80 such that the inner piston 58 is axially slidably displaceable with respect to the outer piston 84 but is restrained from independent rotational movement with respect thereto.

The forward index wheel 88 includes arcuate slots 102 in axial registration with the openings 66 in the rear wheel 64. The periphery of the forward wheel 88 is provided with index notches 104. The number of notches 104 corresponds to the number of conductors in the outer array 18 (i.e., fifteen) and are thus equiangularly arranged about the wheel 88 at angular spacings of twenty-four degrees.

A primary conductor guide member 114 is provided concentrically about the exterior of the outer piston 84. The guide member 114 is substantially cylindrical and includes an annular shoulder 116 adapted to abut closely against the collar 52C of the head support bracket 52. The primary guide member 114 is provided with axially extending channels 118 on the exterior surface thereof which register axially with the slots 102 and the openings 66 respectively provided in the forward wheel 82 and the rear wheel 64. The forward end of the primary guide member 114 confronting the gripping arrangement 44 is provided with a plurality of scooped indentations 120 which form conductor guide slots useful in a manner to be described. The indentations 120 correspond in number to the number of the conductors 22 in the outer array 18 (i.e., fifteen). The indentations 120 communicate with the hollow interior 122 of the member 114. The primary guide member 114 is bolted through bolts 124 to the forward wheel 88 such that the indentations 120 align axially with the notches 104 in the wheel 88.

Disposed radially outwardly of the primary guide member 114 is an auxiliary guide member 126. The member 126 includes a cylindrical portion 128 concentrically surrounding the forward portion of the primary member 114. The leading edge of the auxiliary guide member 126 is provided with a series of indentations 130. The indentations 130 correspond in number to the number of conductors in the inner array 20 (i.e., nine) and are equiangularly arranged in axial alignment with the indentations 98 (in the outer piston 84) and the notches 68 (on the rear wheel 64). Trailing from the rear of the cylindrical portion 128 is a plurality of struts 132 each of which constricts through a shoulder 134 into a rearwardly projecting spoke 136. Enlarged heads 138 are provided at the end of each of the spokes 136.

The struts 132 extend rearwardly from the auxiliary guide member 126 through the channels 118 and through the enlarged slots 102 respectively formed in the primary guide member 114 and in the forward wheel 88. The shoulder 134 is disposed a predetermined distance 142 rearwardly of the surface 92 that defines the end of the outer piston 84. The shoulder 134 is disposed a distance 144 from the face 64F of the rear wheel 64.

An indexing arrangement or assembly generally indicated by reference character 146 is suitably secured by a support post 147 in a fixed position with respect to the base plate 30. The indexing assembly 146 is pivotally movable in the direction of the arrows 148T and 148A respectively toward and away from the axis 50A of the head 50 by a suitable actuator schematically indicated at 149. In FIG. 1 the assembly 146 is in the retracted position spaced away from the axis 50A. The indexing assembly 146 includes a pair of working surfaces 150, 152 disposed parallel to the axis 50A and a pair of working surfaces 151, 153 which extend perpendicular thereto. The surfaces 150, 152 respectively operate to engage the index notches 104 and 68 on the wheels 88 and 64 to thereby lock these wheels in appropriate discrete, angularly spaced index positions with respect to the axis 12A of the cable 12. The surfaces 151 and 153 operate against the rear of the wheels 88 and 64, respectively, to prevent displacement of the head 50 away from the gripping arrangement 44. The edge of the surface 153 extends closer to the axis 50A to permit the wheel 88 to rotate beneath the surface 151 while the wheel 64 is locked in its indexed positions. It should be appreciated that the indexing action afforded by the assembly 146 in the manner to be described may be provided by any suitable arrangement. Actuators schematically indicated at 156, 158, and 160 are provided and cooperate to form a rotator assembly for rotating the rear wheel 64, the forward wheel 88, and the gripping means 44, respectively in opposed angular directions about the collinear axes 12A, 50A.

Mounted on a suitable fulcrum 164 secured to the base plate 30 is a grasping finger in the form of a lever 166. The finger 166 is provided with an enlarged grasping end 168 having an inclined camming surface 170 and a conductor-engaging slot 172 thereon. As will be developed herein the finger 166 is reciprocally pivotally movable in the direction of the arrows 174T and 174A respectively toward and away from the axes 12A, 50A. An actuator indicated schematically at 178 is provided for effecting the pivotal movement of the finger 166.

The operation of the apparatus may now be set forth.

FIG. 1 depicts the apparatus in its initial position. The cable 12 is prepared at each axial end by stripping the jacket 14 a predetermined distance back from its axial end thereof and removing the sheathing 16 (and the braid 26, if present). The cable 12 ends are cut in order to expose that portion of the individual conductors 22 in the layered arrays 18, 20 for a distance corresponding to the distance between the confronting ends of the head assembly 50 and the gripping arrangement 44. In practice, a pair of apparatus 10 may be disposed with each end of the same cable 12 being managed by one of the apparatus 10. With the cable 12 so stripped the free cut end thereof is inserted for a predetermined distance into the forward end of the hollow interior 122 of the primary guide member 114 of the apparatus 10. Preferably the cable 12 is cut and stripped such that it may be gripped so that the axial ends of the conductors 22 project a distance into the interior 122 of the primary guide member 114. The conductors 22 axially engage the abutment surface defined by the rim 100 of the outer piston 84 without sagging or buckling between the gripping means 44 and the head 50. The primary guide member 114 has an inner diameter which closely receives the outer array 18.

The actuator 40 operatively connected to the carriage 36 is then actuated causing the carriage 36 to displace relatively to the base plate 30 in the forward direction 36F to move the carriage 36 forwardly within the slot 34 (or, conversely, to displace the base plate 30 rearwardly with respect to the carriage 36). The relative motion of the carrier 36 is transmitted to the head assembly 50 as a result of the abutment between the collar 52C of the bracket 52 and the shoulder 116 provided on the exterior of the primary conductor guide member 114. Due to the relative displacement of the carriage 36 with respect to the base plate 30 the clearance distance 35 defined between the leading edge of the carriage 36 and the forward boundary 34F of the slot 34 is closed and the wheel 88 brought beneath the indexing assembly 146. Motion of the carriage 36 is halted when the forward edge of the carriage 36 abuts against the stop surface 34F of the slot 34 (FIG. 2). The actuator 149 operatively associated with the indexing assembly 146 displaces the same in the direction 148T into engagement with the wheel 88 (FIG. 2). The actuator 158 operatively associated with the wheel 88 is actuated to lock one of the notches 104 on the wheel 88 against the surface 150 and thus angularly lock the wheel 88 at one of the index positions defined by the notches 104. The surface 151 axially locks the wheel 88 to prevent movement of the head 50 away from the gripping arrangement 44. The actuators 158 and 160 are actuated to rotate the cable 12 in the appropriate directions which will remove the helix from the outer array 18 and thus dispose the axis 22A of each conductor 22 in the outer array 18 in parallel to the axis 12A of the cable 12 at least in that region generally forwardly of the head 50 wherein the conductors 22 in the buckled array to be formed can be grasped by the finger 166. As a result of the displacement of the head assembly 50 relative to the base plate 30 of the abutting interaction and contact between the abutment surface defined by the rim 100 and the axial ends of the conductors 22 of the outer array 18 causes the individual conductors 22 in the outer array 18 to bow or buckle radially outwardly relative to the axis 12A of the cable as shown in exaggerated form for purposes of illustration in FIG. 2. The individual conductors 22 in the outer array 18 therefore buckle radially outwardly from the axis 12A of the cable 12 to a radial point 182 radially from the axis 12A to form a buckled or spread array. As the conductors 22 in the outer array 18 are buckled individual ones of the conductors 22 are guided into the guide indentations 120 at the forward end of the primary guide assembly 114.

Any suitable means may be utilized to identify which of the individual conductors in the outer array 18 is to be first brought into a predetermined reference position indicated by a vertical reference line 186 (FIG. 5A) extending from the base plate 30 through the axis 12A of the cable. In the drawing the reference line 186 is shown extending perpendicularly of the base plate 30. However, it is to be understood that one or more reference lines 186 may be defined at any predetermined positions about the axis 12A of the cable 12 and that the rotator assembly is able to rotate any predetermined conductor 22 in the buckled array 18 past any predetermined reference line. An additional grasping finger may be provided at each reference line with any predetermined angular distance being defined therebetween. Each such finger assembly is operative to grasp a conductor disposed at one of the reference positions and transpose or shift it from the reference position to another position. As such it should be appreciated that the use of more than one fixture F movably disposed with respect to the head assembly 50 and in operative association with the grasping assemblies lies within the contemplation of this invention.

Selecting which of the conductors 22 in the outer array 18 is to be removed from the buckled array and placed into the fixture F may be effected by any suitable indentification means. Suffice it to say that in accordance with this invention particular ones of the conductors 22 in the outer array 18 are brought past the reference line (or lines) 186 in some predetermined sequence. When one of the conductors 22 is so positioned along the reference line (or lines) 186 the grasping finger (or fingers) 166 is actuated by the actuator 178 operatively associated therewith causing the grasping end 168 to be displaced toward the axis 12A in the direction of the arrow 174T. The movement of the grasping end 168 brings the inclined cam surface 170 thereon into engagement with the first conductor 22-1 that has been positioned by the actuator 158 along the reference line 186. The relative motion of the grasping end 168 along the reference line 186 in the direction of the arrow 174T causes the conductor 22-1 disposed on the reference line 186 to be displaced sidewise in the direction of the arrow 188 as the end 168 moves from a position external to the buckled array of conductors to a position on the interior thereof. As the end 168 passes to the interior of the buckled array the resiliency of the conductor 22-1 returns the axis of the same in the counter direction 189 into collinearity with the reference line 186.

Thereafter, the actuator 178 is reversed causing the grasping end 168 of the finger 166 to move in the counter direction of the arrow 174A. This motion captures the conductor 22-1 in the slot 172 provided thereon. Continued motion of the grasping end 168 (FIG. 5C) displaces and transposes the conductor 22-1 along the reference line 186 into a selected slot S provided in the fixture F that has been positioned by the actuator 42 operatively associated therewith to lie on the reference line 186. A restoring spring 192 (FIG. 1) returns the finger 166 to its initial position. Actuation of the actuators 158 and 160 thereupon brings another of the conductors 22 in the outer array 18 into position along the reference line 186. Also the actuator 42 displaces the fixture F so that another of the slots S therein is also disposed along the reference line 186 and thus positioned to receive another of the conductors.

It should be appreciated that the conductors 22 in the outer array 18 may be selectively placed in any particular sequence within any of the slots in the fixture F. To accommodate this the wheel 88 and gripping arrangement 44 may be indexed in either angular direction under programmable control to bring any predetermined one of the conductors into position along the reference line 186. The wheel 88 is locked in any indexed position by the action of the surface 150 against the index notches 104. The fixture F may be displaced within the recess 32 to dispose any predetermined one of the slots S therein into the operative position along the reference line 186 whereupon it may receive the individual conductor 22 selected from the buckled array by the action of the grasping finger 166.

Once all the conductors in the outer array 18 have been disposed into the appropriate slots in the fixture F the conductors in the inner array 20 are now exposed. It is noted that displacement of the head assembly 50 with the carriage 36 which generated the buckling of the outer array 18 of conductors 22 also caused relative motion to occur between the cable 12 and the head 50 thereby causing the leading ends of the conductors 22 of the inner array 20 to enter into the interior 86 of the outer piston 84. This action is facilitated by fixing the interior portion 86 of the outer piston 84 with a diameter substantially equal to the diameter of the inner array 20 of conductors. Thus, the axial ends of the conductors 22 of the inner array 20 are spaced from the abutment surface defined by the pointed rim 78 provided on the forward end of the inner piston 58 by a predetermined distance 192 (FIG. 2).

Figure 3:
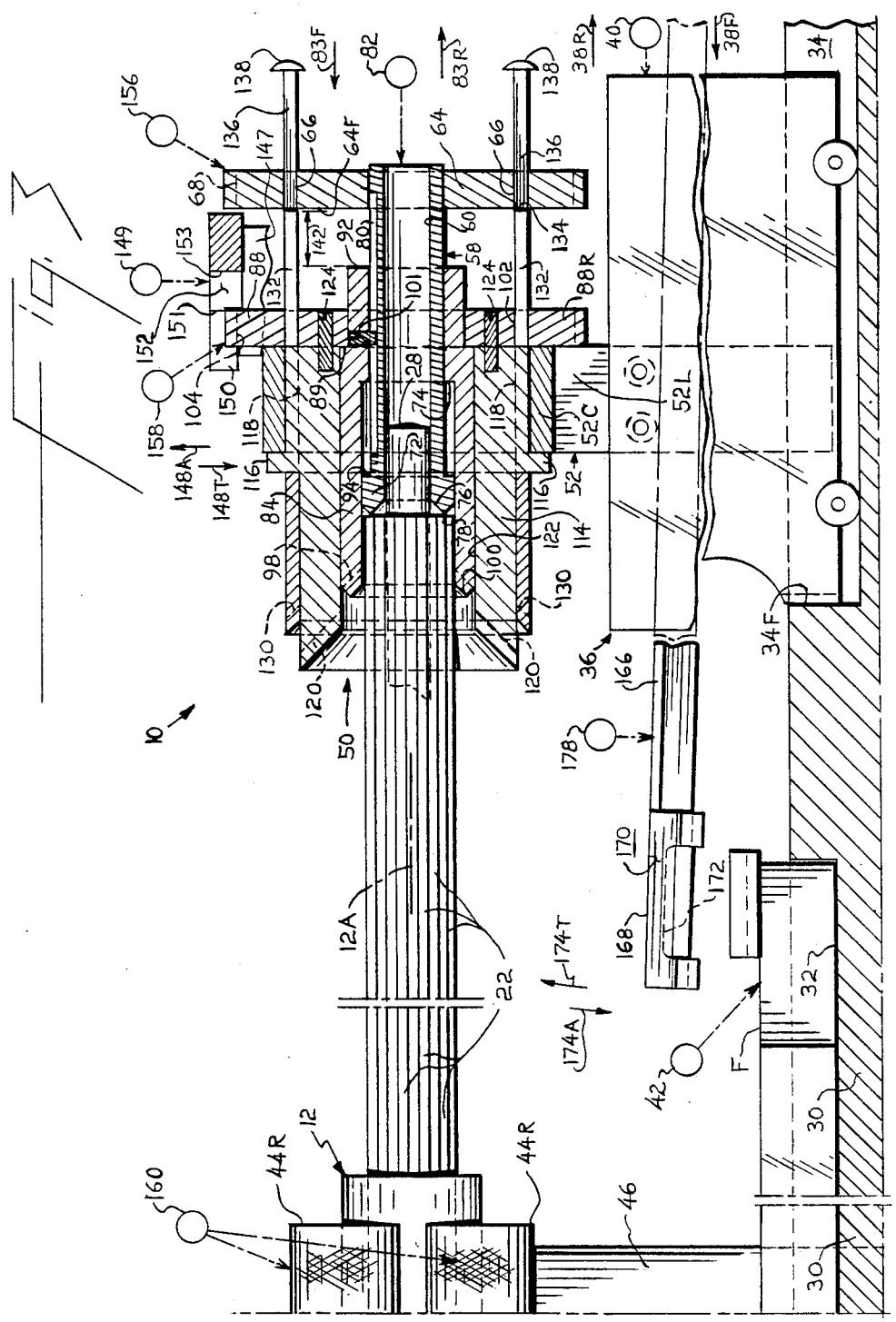

As shown by reference to FIGS. 2 and 3 the actuator 82 operatively associated with the inner piston 58 is actuated to cause displacement of the inner piston 58 in the direction of the arrow of 83F. The rear wheel 64 connected to the inner piston 58 is caused to advance along the spokes 136 to close the distance 144 between the surface 64F of the rear wheel 64 and the shoulder 134. Thus, simultaneously, the distance 192 between the pointed rim 78 at the leading edge of the inner piston 58 and the axial ends of the conductors 22 in the inner array 20 is closed, spacing the shoulder 74 (on the inner piston 58) from the shoulder 94 (on the outer piston 84) and bringing the abutment surface defined by the rim 78 of the inner piston 58 into axially abutting contact with the axial ends of the conductors 22 of the inner array 20. Continued axial motion of the inner piston 58 in the direction of the arrow 83F slidably displaces the inner piston 58 with respect to the outer piston 84 and causes the conductors 22 of the inner array 20 to begin to buckle radially outwardly in a manner akin to the buckling action of the outer array 18. This initial buckling action is not illustrated in FIG. 3.

Guidance for the buckling of the conductors of the inner array 20 is provided by the auxiliary guide member 126 and by the outer piston 84. Continued axial motion of the inner piston 58 in the direction 83F causes abutting action to occur between the surface 64F of the rear wheel 64 and the shoulder 134 on the spokes 136 depending from the auxiliary guide member 126.

Figure 4:
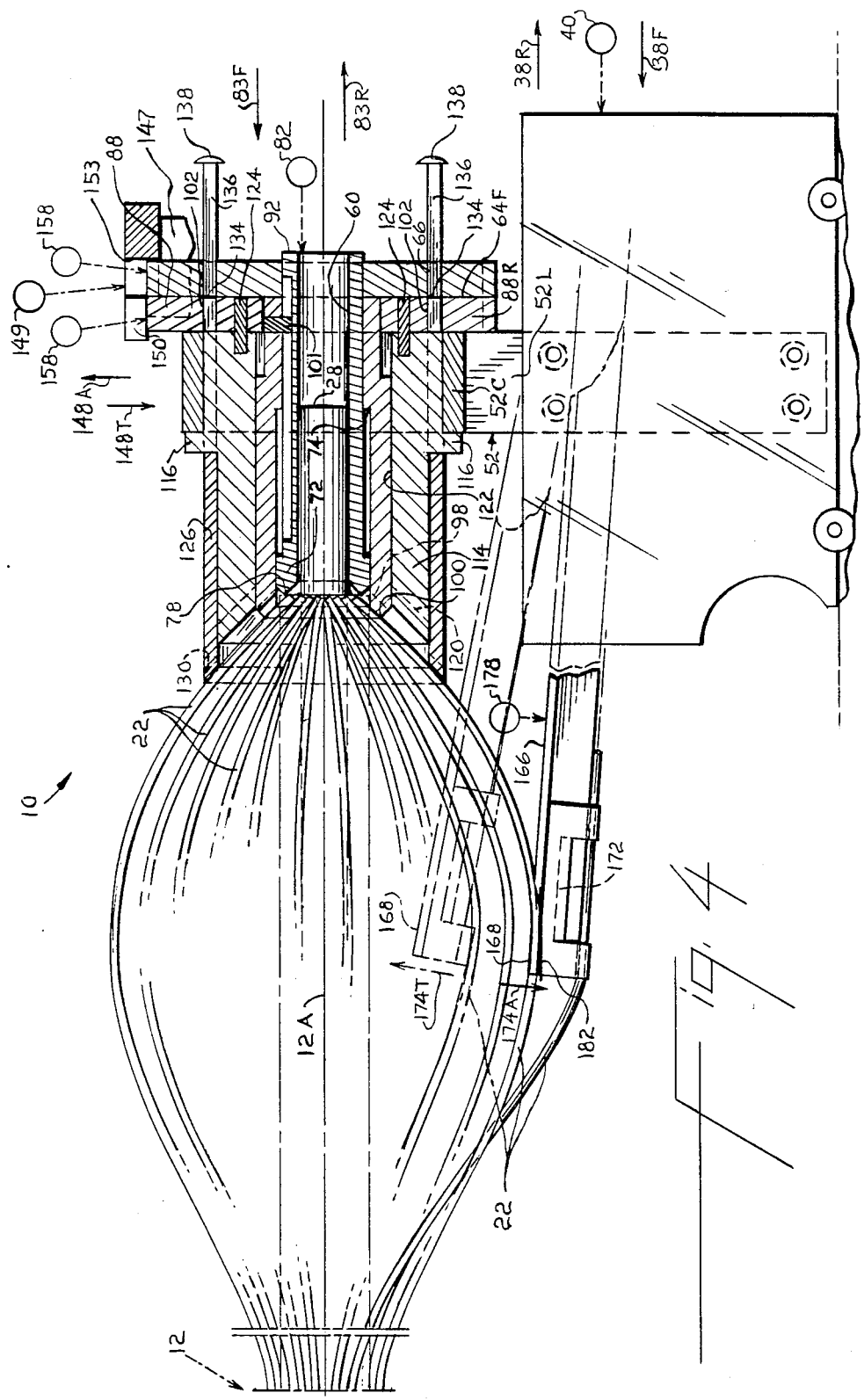

As a result, as the inner piston 58 advances the auxiliary guide member 126 is displaced forwardly with respect to the exterior of the primary guide assembly 114 thereby bringing the guide indentations 130 at the leading end of the auxiliary guide member 126 into a position where they may assist in guiding the buckling conductors 22 of the inner array 20 (FIG. 4). Further axial motion of the inner piston 58 causes face 64F of the wheel 64 to engage the surface 92 on the outer piston 84. This advances the outer piston 84 allowing the indentations 98 therein to assist in guiding the buckling conductors. The motion of the inner piston 58 is arrested by engagement between the surface 64F of the rear wheel 64 and the surface 88R of the wheel 88. In this position, depicted in FIG. 4, the inner array 20 is in the buckled state (to the same radial extent 182), the indexing arrangement 146 (which was retracted in the direction 148A after the conductors in the outer array are placed in fixture F) is moved in the direction 148T and the rear wheel 64 is brought into position under the surface 152 of the indexing arrangement 146. The surface 153 locks the wheel 88 axially in place. The motion of the inner piston 58 with respect to the cable 12 causes the core 28 of the cable 12 to project into hollow bore 60 of the inner piston 58 which is sized to receive the same.

With the inner array of conductors 20 disposed in the buckled condition actuation of the actuators 156 and 160 in the appropriate directions eliminates the helix of the inner layer conductors. Thereafter, actuation of the actuators 156 and 160 causes rotation of the rear wheel 64 simultaneously with the rotation of the gripping means 44. This action indexes the conductors of the inner array 20 past the reference line 186 and facilitates the selective displacement of the individual conductors 22 in the buckled array 20 into the appropriate selected slots in the fixture F by the action of the grasping finger 166 in the same manner as discussed earlier in connection with the conductors of the outer array.

With all of the conductors 22 of the inner array placed in the fixture F all of the actuators are actuated to restore the apparatus to the initial position (FIG. 1).

Those skilled in the art having benefit of the teachings of the present invention as hereinabove set forth may effect numerous modifications thereto. These modifications are, however, to be construed as lying in the scope of the present invention as defined in the appended claims.

I claim:

1. Apparatus for separating the individual conductors of a cable arranged as a multi-conductor array comprising:
    a gripping assembly for gripping the exterior of the array at a predetermined point spaced from the axial ends of the conductors;
    a member having an abutment surface thereon engageable against the axial ends of the individual conductors of the array;
    an actuator for displacing the abutment surface along the axis of the cable toward the gripping assembly thereby bowing the conductors between their axial ends and the gripping assembly to form a buckled array thereof in which each individual conductor is buckled outwardly from the axis of the cable;
    a rotator assembly for rotating each conductor in the buckled array past a predetermined reference position; and
    a finger for grasping each conductor when it is disposed at the reference position and transposing it to a different position.

2. The apparatus of claim 1 further comprising an indexing arrangement operatively associated with the rotator assembly for indexing the rotation of the conductors to discrete index positions angularly spaced about an axis extending through the cable.

3. The apparatus of claim 1 further comprising a surface operatively engageable against the member to prohibit displacement thereof in a direction tending to enlarge the axial distance between the member and the gripping assembly.

4. The apparatus of claim 1 wherein the finger includes a camming surface and a conductor-engaging slot thereon, movement of the finger from a position exterior to the buckled array to the interior thereof bringing the camming surface into engagement with a conductor disposed at the reference position and causing the same to resiliently displace away from the reference position to permit the finger to move to the interior of the buckled array, movement of the finger in a counter direction causing the slot to engage the conductor thereby to effect the transposition thereof.

5. The apparatus of claim 1 further comprising: a fixture adapted to receive the transposed conductor therein; and, an actuator for selectively moving the fixture with respect to the reference position.

6. Apparatus for separating the individual conductors of a cable organized with the conductors thereof being layered into a plurality of substantially concentric multi-conductor arrays, the cable having an axis therethrough, comprising:
    a gripping assembly for gripping the exterior of the cable at a predetermined point spaced from the axial end of the cable;
    an inner and an outer piston concentrically arranged with respect to each other, each piston having an abutment surface thereon respectively engagable against the axial ends of the conductors in the inner and outer arrays;
    an actuator for sequentially displacing the outer and the inner pistons with respect to the axis of the cable and into abutting contact with the conductors in the outer and inner arrays of conductors to cause the same respectively to form buckled arrays in which each individual conductor is buckled outwardly from the axis of the cable;

a rotator assembly for rotating each conductor in each buckled array past a predetermined reference position; and a finger for grasping each conductor when it is disposed at the reference position and transposing it to a different position.

7. The apparatus of claim 6 further comprising an indexing arrangement operatively associated with the rotator assembly for indexing the rotation of the conductors in each buckled array to discrete index positions angularly spaced about the axis of the cable.

8. The apparatus of claim 7 wherein the indexing arrangement comprises a first pair of surfaces each disposed parallel to the axis of the cable, one of the first pair of surfaces being operably engagable with a respective one of the pistons thereby to index the rotation of the conductors in each array.

9. The apparatus of claim 8 wherein the indexing arrangement further comprises a second pair of surfaces disposed perpendicular to the axis of the cable, one of the second pair of surfaces being operably engagable with a respective one of the pistons to limit movement thereof along the axis tending to increase the distance from the gripping arrangement.

10. The apparatus of claim 7 further comprising a pair of surfaces each one of which is operatively engagable with a respective one of the pistons to limit movement thereof along the axis tending to increase the distance from the gripping arrangement.

11. The apparatus of claim 6 further comprising a pair of surfaces each one of which is operatively engagable with a respective one of the pistons to limit movement thereof along the axis tending to increase the distance from the gripping arrangement.

12. The apparatus of claim 6 further comprising:
a base plate;
a carriage mounted for relative movement with respect to the base plate;
the outer piston being carried with the carriage as the same moves with respect to the base plate to engage the abutment surface on the outer piston against the conductors in the outer array to cause the buckling of the same; and
the inner piston being slidable with respect to the outer piston to engage the abutment surface therein against the conductors in the inner array to cause the buckling of the same.

13. The apparatus of claim 12 further comprising:
a primary guide member disposed about the outer piston, the primary guide member having an array of indentations therein arranged to receive the conductors in the outer array as they are buckled outwardly from the axis of the cable.

14. The apparatus of claim 13 further comprising:
an auxiliary guide member disposed about the primary guide member, the auxiliary member having an array of indentations therein arranged to receive the conductors in the inner array as they are buckled outwardly from the axis of the cable.

15. The apparatus of claim 6 wherein the finger includes a camming surface and a conductor-engaging slot therein, movement of the finger from a position exterior to the buckled array to the interior thereof bringing the camming surface into engagement with a conductor disposed at the reference position and causing the same to resiliently displace away from the reference position to permit the finger to move to the interior of the buckled array, movement of the finger in a counter direction causing the slot to engage the conductor thereby to effect the transposition thereof.

16. The apparatus of claim 6 further comprising: a fixture adapted to receive the transposed conductor therein; and, an actuator for selectively moving the fixture with respect to the reference position.

* * * * *